United States Patent
Zhuang et al.

(10) Patent No.: US 10,542,772 B2
(45) Date of Patent: Jan. 28, 2020

(54) IMMOBILIZED DILUENTS FOR SMOKING ARTICLES

(71) Applicant: Philip Morris USA Inc., Richmond, VA (US)

(72) Inventors: Shuzhong Zhuang, Richmond, VA (US); Georgios D. Karles, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 426 days.

(21) Appl. No.: 15/430,631

(22) Filed: Feb. 13, 2017

(65) Prior Publication Data

US 2017/0150750 A1  Jun. 1, 2017

Related U.S. Application Data

(62) Division of application No. 13/793,537, filed on Mar. 11, 2013, now Pat. No. 9,603,385, which is a division
(Continued)

(51) Int. Cl.
| | |
|---|---|
| A24B 15/28 | (2006.01) |
| A24B 15/24 | (2006.01) |
| A24D 3/06 | (2006.01) |
| A24C 5/47 | (2006.01) |
| A24F 47/00 | (2006.01) |
| B01J 20/20 | (2006.01) |
| B01J 20/28 | (2006.01) |

(52) U.S. Cl.
CPC .......... *A24B 15/283* (2013.01); *A24B 15/245* (2013.01); *A24B 15/246* (2013.01); *A24B 15/28* (2013.01); *A24B 15/287* (2013.01); *A24C 5/472* (2013.01); *A24D 3/06* (2013.01); *A24F 47/008* (2013.01); *B01J 20/20* (2013.01); *B01J 20/28004* (2013.01); *B01J 20/28019* (2013.01); *B01J 20/28061* (2013.01); *B01J 20/28064* (2013.01); *B01J 20/28071* (2013.01); *B01J 20/28073* (2013.01); *B01J 20/28076* (2013.01)

(58) Field of Classification Search
None
See application file for complete search history.

(56) References Cited

U.S. PATENT DOCUMENTS

| 3,046,996 A | 7/1962 | Gary |
|---|---|---|
| 4,637,408 A | 1/1987 | Rainer et al. |

(Continued)

FOREIGN PATENT DOCUMENTS

EP  0223454 B1  5/1987

OTHER PUBLICATIONS

Koller, Kent, "APS Silica Gel", 1998, Philip Morris. Accessed Dec. 9, 2010: http://legacy.library.ucsf.edu/tid/alv31b00.
(Continued)

*Primary Examiner* — Michael J Felton
(74) *Attorney, Agent, or Firm* — Buchanan Ingersoll & Rooney PC

(57) ABSTRACT

Immobilized diluents in a smoking article are provided, wherein diluents can be immobilized through absorption and/or adsorption of the diluents into immobilizing materials, such as sorbents like silica gels. By immobilizing diluents, the diluents can be available for vaporization, while still being protected from migration and/or loss of the diluents in a smoking article.

15 Claims, 8 Drawing Sheets

Related U.S. Application Data of application No. 11/812,028, filed on Jun. 14, 2007, now Pat. No. 8,393,333.

(60) Provisional application No. 60/835,090, filed on Aug. 3, 2006.

(56) References Cited

U.S. PATENT DOCUMENTS

| | | |
|---|---|---|
| 4,715,390 A | 12/1987 | Nichols et al. |
| 5,060,673 A | 10/1991 | Lehman |
| 5,499,636 A | 3/1996 | Baggett, Jr. et al. |
| 5,666,976 A | 9/1997 | Adams et al. |
| 5,692,525 A | 12/1997 | Counts et al. |
| 5,692,526 A | 12/1997 | Adams et al. |
| 5,915,387 A | 6/1999 | Baggett, Jr. et al. |
| 5,988,176 A | 11/1999 | Baggett, Jr. et al. |
| 6,026,820 A | 2/2000 | Baggett, Jr. et al. |
| 6,378,528 B1 | 4/2002 | Beeson et al. |
| 8,393,333 B2 | 3/2013 | Zhuang et al. |
| 2005/0000531 A1 | 1/2005 | Shi |
| 2005/0241656 A1 | 11/2005 | Kennison |
| 2011/0155154 A1 | 6/2011 | Zhuang |

OTHER PUBLICATIONS

Mazzieri, et al., "Adsorptive Properties of Silica Gel for Biodiesel Refining", Oct. 8, 2008, American Chemical Society, Energy & Fuels, 22, 4281-4284.

| Prototype Description[1] | Sample Code 11-mg Tar | Sample Code 6-mg Tar | Prototype Design (lengths in mm) |
|---|---|---|---|
| Control cigarette with 8 mm carbon beads in filter. Either 11-mg tar or 6 mg-tar prototypes. | A-01 | B-01 |  |
| 110mg (glycerin-impregnated silica) in filler[2] | A-02 | B-02 |  |
| 220mg (GIC) in filler | A-03 | B-03 |  |
| 50mg (Silica only) in filler | A-04 | B-04 | 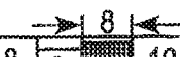 |
| 100mg (Silica only) in filler | A-05 | B-05 |  |
| 110mg (GIC) in filler, no carbon and empty cavity in filter | A-06 | B-06 |  |
| 220mg (GIC) in filler, no carbon and empty cavity in filter | A-07 | B-07 | 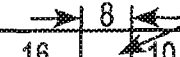 |
| 110mg (GIC), carbon replaced by cellulose acetate | A-08 | B-08 |  |
| 220mg (GIC), carbon replaced by cellulose acetate | A-09 | B-09 |  |

[1] The weight of tobacco filler was fixed at 550 mg for all the prototypes.
[2] Glycerin-impregnated silica (GIC) contains about 54.5 wt% of glycerin and 45.5 wt% of Davisil 150 Å silica.

FIG. 5

IMMOBILIZED DILUENTS FOR SMOKING ARTICLES

CROSS REFERENCE TO RELATED APPLICATIONS

This application is a divisional application of U.S. patent application Ser. No. 13/793,537, filed Mar. 11, 2013, which is a divisional application of U.S. patent application Ser. No. 11/812,028, filed Jun. 14, 2007, now U.S. Pat. No. 8,393,333, issued Mar. 12, 2013, which claims benefit of the filing date of U.S. Provisional Application Ser. No. 60/835,090, filed Aug. 3, 2006, the entire contents of which are incorporated herein by reference.

BACKGROUND

Diluents can be added to smoking articles to alter the composition of total particulate matter (TPM) in tobacco smoke. However, the diluents can be lost, can discolor tobacco cut filler and can change processing conditions for smoking mixtures. Thus, immobilized diluents are desired which can circumvent the aforementioned issues.

SUMMARY

In an exemplary embodiment, an immobilized diluent comprises: a sorbent, wherein the sorbent comprises a porous material with a surface area of at least 50 $m^2/g$, and/or wherein the sorbent has a pore volume of about 0.2 cc/g to about 1.5 cc/g, and a diluent absorbed and/or adsorbed in the sorbent, wherein the diluent comprises an aerosol forming agent.

In another exemplary embodiment, a cigarette comprises: a filter containing a first sorbent material; a tobacco rod attached to the filter; and immobilized diluents in the tobacco rod, wherein the immobilized diluents comprise a second sorbent material with a pore volume of at least about 0.1 cc/g and diluent, wherein the diluent comprises an aerosol forming agent.

In another exemplary embodiment, a method of reducing tar generated from tobacco combustion, pyrolysis or distillation in tobacco smoke, comprises: heating a tobacco-containing portion of a smoking article; and releasing diluents immobilized within porous immobilizing particles in a tobacco-containing portion of the smoking article by heating the diluents immobilized within the porous immobilizing particles, wherein the released diluent alters the composition of the TPM in the tobacco smoke.

In another exemplary embodiment, a method of making a cigarette, comprises: forming immobilized diluents by applying diluents to sorbent materials, wherein the diluents comprise aerosol forming agents; mixing the immobilized diluents with tobacco cut filler; forming a tobacco rod from the tobacco cut filler with the immobilized diluents mixed therein; and attaching the tobacco rod to a filter.

BRIEF DESCRIPTION OF THE DRAWINGS

FIG. 5 illustrates exemplary cigarettes and their corresponding sample codes corresponding to the exemplary cigarettes and sample codes listed in Tables 3-15.

DETAILED DESCRIPTION

Diluents can be used in smoking articles to alter the composition of the total particulate matter (TPM) of tobacco smoke. As the concentration of inert diluents in TPM increases, the concentration of TPM produced by tobacco pyrolysis, combustion or distillation on a mass basis decreases.

Figure 1:
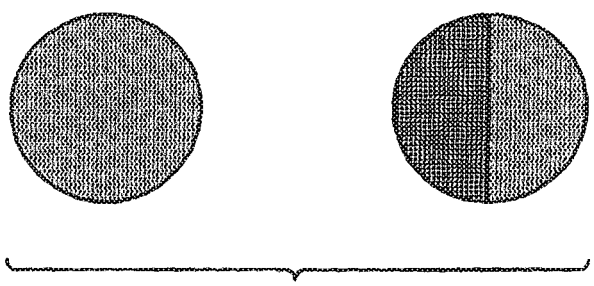
FIG. 1 illustrates one mass unit of TPM without diluent compared to one mass unit of TPM diluted by diluent (50% TPM).

The change in TPM concentration caused by diluents is illustrated in FIG. 1, which illustrates one mass unit of TPM without dilution compared to one mass unit with dilution, wherein the diluted mass unit of TPM has about one-half of the TPM concentration. Thus, by providing diluents, TPM concentration can be reduced on a mass basis measurement. However, diluents can be lost to the environment or components of a smoking article due to their physical characteristics (i.e., because they are often in liquid or vapor form and evaporate).

In order to reduce loss of diluents in a smoking article, immobilized diluents are disclosed herein. By providing diluents in an immobilized form, the diluents can be protected from loss to the environment (e.g., adsorption and/or absorption, hereinafter collectively "sorption") or to components of a smoking article.

A. Immobilization Of Diluents

As used herein, "immobilized diluents" are intended to include diluents which are substantially immobilized with reduced migration such that the diluents have reduced interaction with the environment and/or components of a smoking article. For example, immobilizing materials, such as highly porous materials like sorbents (e.g., silica gels, zeolites, activated carbons, and/or polymeric porous materials) can be used to absorb or adsorb diluents within their pores and surfaces.

As used herein, "highly porous" is intended to include materials with pore volumes exceeding about 0.2 cc/g. In exemplary embodiments, highly porous immobilizing materials have pore volumes between about 0.2 cc/g and about 1.5 cc/g.

The quantity of diluents within exemplary immobilized diluents can be widely varied depending upon the methods of forming the immobilized diluents, the weight and infusibility of the diluents, the weight and capacity (i.e., the pore volume and surface area) of the containment portion of the immobilizing material, etc. However, if the level of diluents added exceeds the capacity of the immobilizing material, excess diluents may not be immobilized.

Exemplary immobilized diluents can be provided in particulate forms, and can be round and/or spherical in shape. As used herein, the term "particulate" is intended to include discrete particles, granular substances, and/or powders.

Immobilized diluents can be any size provided that an effective level of diluent can be incorporated therein and the immobilized diluent particulate can fit within the smoking article. In exemplary embodiments, the diluents do not appreciably increase the size of the immobilizing material; therefore the resulting immobilized diluents are about the same size as the original immobilizing material. Immobilized diluents for cigarettes, for example, can have a transverse dimension in the range of about 0.05 mm to about 2 mm.

The term "immobilizing material" is intended to include any material that can sufficiently absorb, adsorb, or hold diluents therein and sufficiently immobilize the diluents from diluent loss due to environmental factors, ageing, or sorption within a smoking device. An immobilizing material, for example, can deter the migration of otherwise non-immobilized diluent into components of a smoking article, and therefore can extend the shelf lives of both the smoking article and the diluents. For example, cigarettes with activated carbon filters can have shorter shelf lives as the diluents can deactivate the activated carbon and the activated carbon can remove the diluents from the cigarettes.

Additionally, immobilizing diluents can have other advantages. For example, by adding diluents directly to tobacco (without immobilization of the diluents), tobacco rods formed from the diluent containing tobacco can suffer from "spotting" (i.e., discoloring of a cigarette), loss of firmness of a tobacco rod, and increased manufacturing costs (i.e., slower processes due to the difficulties caused by the diluents in the tobacco during tobacco rod formation, such as tobacco being less free-flowing). Thus, by immobilizing diluents, these problems can be substantially reduced, while the advantages provided by the diluents can still be realized.

Exemplary immobilizing materials have high porosity to absorb and/or adsorb diluent therein. For example, pore volumes of at least about 0.1 cc/g or between about 0.2 cc/g to about 1.5 cc/g and/or surface areas (as measured by BET, as discussed below) of at least about 50 m$^2$/g or between about 100 m$^2$/g to about 1000 m$^2$/g can be used.

In exemplary embodiments diluents are infused or impregnated within immobilizing material. For example, immobilized diluents can be formed by placing sorbent materials within a vessel containing liquid and/or vaporous diluents, wherein diluents can be sorbed by the sorbent materials to immobilize the diluents. It is noted that the vessel can optionally be pressurized and/or heated and held at that pressure and/or elevated temperature until the immobilizing material is sufficiently infused or impregnated with diluents to infuse or impregnate higher levels of diluents if desired.

Alternatively, the immobilizing material can be placed in contact with diluents to immobilize the diluents. For example, the immobilizing material can be soaked in or coated by liquid and/or vaporous diluents, wherein the diluents are sorbed into the immobilizing material. In exemplary embodiments, liquid and/or vaporous diluents are absorbed and/or adsorbed into pores of a highly porous sorbent material. For example, if the diluent comprises glycerin and/or propylene glycol, and the immobilizing material is silica gel, the glycerin and/or propylene glycol can be loaded into the silica gel at about 60% to 120 wt % of the silica gel.

Additionally, the immobilized diluents can optionally be sealed with a coating to further immobilize the diluents. For example, a silica gel particle can include glycerin therein, and can be coated by a thin polymer layer, such as a polysaccharide, to further immobilize the glycerin.

In exemplary embodiments, the immobilizing materials and the immobilized diluents are non-combustible as to provide diluents from a stable, porous structure. As used herein, "non-combustible" is intended to include materials which will not be combusted at tobacco combustion temperatures (i.e., up to about 1200° C.). For example, silica gel can remain stable and non-combustible up to temperatures of about 1200° C. However, it is noted that inert, combustible immobilizing material can also be used.

B. Release Of Diluents

As used herein, "release of diluents" is intended to include mobilizing at least a portion of diluents from an immobilizing material such that the released diluents can interact with tobacco smoke. In order to release the diluents from an immobilizing material, immobilized diluents can be heated to: vaporize or aerosolize (hereinafter collectively referred to as "vaporize") the diluents into a more mobile state such that they are able to escape from the immobilizing material; or degrade the immobilizing material to form larger passages allowing diluents to escape from the immobilizing material.

In exemplary embodiments with diluents absorbed and/or adsorbed within pores and channels of highly porous immobilizing material, the diluents are released as they are heated because the diluents expand with the application of heat and are forced out of the pores and channels of the immobilizing material. Thus, the diluents are vaporized and escape from the pores and channels of the immobilizing material and into mainstream smoke of a smoking article.

As used herein, "heated" or "heating" is intended to include elevating the temperature of an immobilized diluent to the point at which vaporization of the diluent or thermal degradation of the immobilizing material can occur. However, in exemplary embodiments, the immobilizing material is non-combustible and remains stable throughout a smoking process.

Vaporization of the diluent or at least partial degradation of the immobilized diluents occurs at elevated temperatures at or above about the boiling points of the diluents. For example, immobilized diluents can be placed within the tobacco and can release diluents when heated to temperatures between about 50° C. and about 900° C. (e.g., above 50° C., 100° C., 200° C., 300° C., 400° C., 500° C., 600° C., 700° C., 800° C.).

Exemplary diluents can be vaporized at temperatures at or above around 180° C. For example, at a pressure of about 760 mmHg, the boiling point of propylene glycol is about 190° C. and release of propylene glycol can be expected at temperatures exceeding 190° C. Boiling point temperatures for exemplary diluents are discussed below and are set forth in Table 1.

C. Exemplary Diluents

The term "diluent", as used herein, is intended to include any aerosol forming compound, material, or chemical, which can modify the characteristics of smoking articles and/or smoke produced when smoking the smoking articles, or to alter the composition of the TPM of tobacco smoke. Exemplary diluents are liquid or vaporous, chemically inert and do not substantially change the taste or feel of the smoke. Additionally, exemplary diluents are not highly volatile, as high volatility can lead to the diluents not being immobilized by the immobilizing material.

Any appropriate diluent or combination of diluents may be contained within immobilizing material to form immobilized diluents, wherein the diluents can be released to modify the characteristics of the smoking articles and/or smoke produced when smoking the smoking articles in which the immobilized diluents are incorporated.

Figure 2:
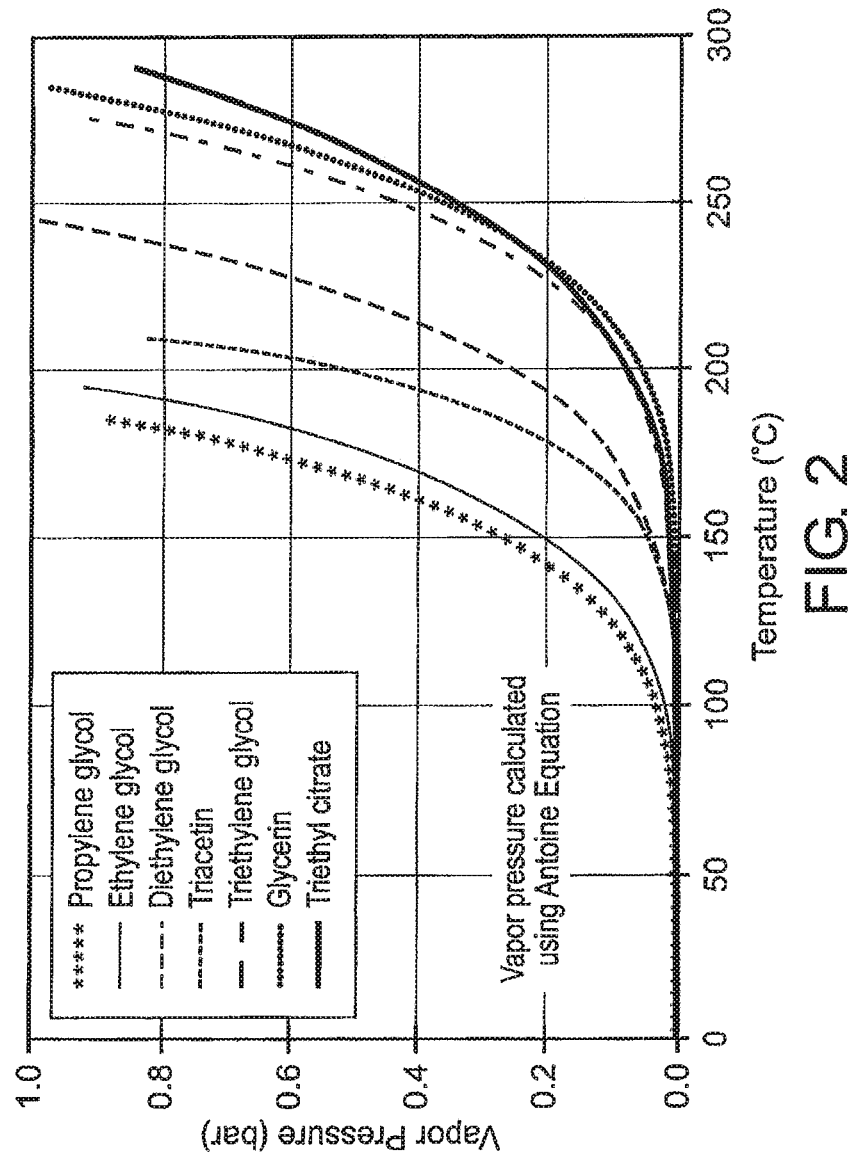
FIG. 2 is a graph comparing vapor pressure of selected diluents at different temperatures.

For exemplary diluents, the amount of aerosols generated during smoking is dependent on their thermodynamic properties. Table 1 lists some exemplary diluents and their thermodynamic properties including boiling point, heat of vaporization, and heat capacity. Table 1 also lists the parameters of Antoine Equation for some compounds. Antoine Equation (as shown below) can be used to estimate the vapor pressure at a given temperature, wherein P is the vaporization pressure, T is the temperature, and A, B, and C are "Antoine coefficients" that vary from substance to substance. FIG. 2 shows the vapor pressures of exemplary diluents at different temperatures calculated using Antoine Equation (below).

$$\log(P) = A - \frac{B}{T+C}$$

For low boiling point, high vapor pressure diluents, such as propylene glycol (PG), immobilization can be especially effective to reduce otherwise high levels of loss due to evaporation or other environmental factors. For example, high levels of PG can be lost during ageing.

While any of the diluents listed in Table 1 can be used, glycerin, propylene glycol, triacetin, triethylene glycol, triethyl citrate, or combinations thereof are preferred diluents.

stance that has the ability to condense or hold molecules of diluents and/or one or more tobacco smoke constituents on its surface, and/or has the ability to take up such components, i.e., through penetration into its inner structure or into its pores. The term "sorbent" as used herein refers to an adsorbent, an absorbent, or a substance that can function as both an adsorbent and an absorbent.

The term "sorption" is intended to encompass interactions on a sorbent surface and within pores and channels of sorbents, such as silica gels, molecular sieves, activated carbons, polymeric porous materials, and/or mixtures

TABLE 1

Thermodynamic properties of selected diluents

| | B.P. at 760 mmHg (° C.) | V.P. at 180° C.[1] (bar) | $\Delta H_v$ (J/mg) | Formula | MW (g/mol) | Cp (J/mg*K) | Antoine Equ. Parameter A | B | C |
|---|---|---|---|---|---|---|---|---|---|
| Propylene glycol[2] | 188 | 0.754 | 0.94 | $C_3H_8O_2$ | 76 | 0.00239 | 5.673 | 2418 | −36.8 |
| Ethylene glycol[2] | 198 | 0.579 | 1.10 | $C_2H_6O_2$ | 62 | 0.00242 | 5.019 | 1964 | −79.3 |
| Diethylene glycol[2] | 245 | 0.127 | 0.58 | $C_4H_{10}O_3$ | 106 | 0.00247 | 4.666 | 1895 | −112.3 |
| Triacetin[2] | 259 | 0.213 | 0.39 | $C_9H_{14}O_6$ | 218 | 0.00180 | 8.802 | 4305 | 1.4 |
| Ethyl laurate | 269 | | 0.39 | $C_{14}H_{28}O_2$ | 228 | | | | |
| Diethyl suberate | 282 | | 0.27 | $C_{12}H_{22}O_4$ | 230 | | | | |
| Triethylene glycol | 285 | 0.034 | 0.53 | $C_6H_{14}O_4$ | 150 | 0.00220 | 6.757 | 3715 | −1.3 |
| Glycerin | 290 | 0.022 | 1.00 | $C_3H_8O_3$ | 92 | 0.00239 | 3.937 | 1412 | −200.6 |
| Ethyl vanillate | 292 | | | $C_{10}H_{12}O_4$ | 196 | | | | |
| Triethyl citrate | 294 | 0.041 | 0.22 | $C_{12}H_{20}O_7$ | 276 | | 3.883 | 1743 | −122.4 |
| Tributyrin | 308 | | 0.35 | $C_{15}H_{26}O_6$ | 302 | 0.00186 | | | |
| Diethyl sebacate | 312 | 0.018 | 0.27 | $C_{14}H_{26}O_4$ | 258 | | 5.822 | 3168 | −34.0 |
| Benzyl phenyl acetate | 320 | | | $C_{15}H_{14}O_2$ | 226 | | | | |
| Benzyl benzoate | 323 | | | $C_{14}H_{12}O_2$ | 212 | | | | |
| Erythritol | 330 | | | $C_4H_{10}O_4$ | 122 | | | | |
| Tetraethylene glycol | 330 | 0.006 | 0.51 | $C_8H_{18}O_5$ | 194 | 0.00218 | 8.200 | 4837 | 9.6 |
| Ethyl stearate | 354 | | 0.52 | $C_{20}H_{40}O_2$ | 313 | | | | |
| Dioctyl sebacate | 420 | | 0.22 | $C_{26}H_{50}O_4$ | 427 | 0.00199 | | | |

[1]vapor pressure at 180 degree Celsius was calculated based upon the Antoine Equation.
[2]The Antoine Equation parameters of these compounds were not found in the literatures; instead, the parameters were regressed from the vapor pressure data found in the literatures.

Alternatively or additionally, immobilized diluents can include additives, such as humectants, flavorants, solvents, etc., immobilized in immobilizing material. For example, suitable additives include chemicals that can aid in the delivery of flavor, provide moisture to mainstream smoke, or deliver flavors via the particulate phase of mainstream smoke (bypassing sorbents in a smoking article). Exemplary additives include, but are not limited to, sorbitol, water, menthol, etc.

D. Exemplary Immobilizing Materials

Exemplary immobilizing material preferably have the following characteristics:

1) sufficient diluent carrying capacity, such that sufficient amounts of diluents can be provided within the immobilizing material;

2) suitable decomposition or release properties, such that the immobilizing material can be heated to combust or decompose the immobilizing material at approximately the same rate as the smoking article, or can release the diluent from the immobilizing material upon provision of heat;

3) suitable robustness or strength, such that the immobilizing material can withstand physical forces, such as those associated with loading the immobilized diluents within a smoking article, without breaking or releasing diluents from the immobilizing material; and 4) appropriately small sizing, such that the immobilizing material with the diluents therein can fit within a smoking article without disturbing the characteristics of the smoking article, such as the diameter of a tobacco rod of a cigarette.

Exemplary immobilizing materials include, but are not limited to, sorbents. As used herein, a "sorbent" is a subthereof. Thus, diluents would be subjected to sorption by a sorbent as a means of immobilizing the diluent within the sorbent.

Exemplary shapes for the immobilizing materials include particulate, spheres, amorphous shapes, rods, blocks, etc., wherein the transverse cross-sectional areas can have any shape, such as circular, triangular, square, etc. For example, discrete particles that are freely flowing, or in the alternative, particulate formed by shredding sheets of immobilizing material can be used. If discrete particles are used, the particles can be sized from about 0.001 mm to about 3 mm. For example, particles sized from about 0.05 mm to about 2 mm can be used to provide desirable air flow (i.e., resistance to draw) and sorption characteristics.

One type of sorbent, activated carbon, as used herein, can be manufactured by any suitable technique. One technique is the carbonization of coconut husk, coal, wood, pitch, cellulose fibers, or polymer fibers, for example. Carbonization is preferably carried out at high temperatures, i.e., 500-900° C. in an inert atmosphere, followed by activation under oxidizing conditions. The activated carbon can be used in the forms of monolithic shapes, granules, beads, powders and/or fibers. If desired, the activated carbon can be incorporated in another material such as paper.

Activated carbon may include a distribution of micropores, mesopores and macropores. The term "microporous" generally refers to such materials having pore sizes of about 20 Å or less while the term "mesoporous" generally refers to such materials with pore sizes of about 20 to 500 Å. The term "macroporous" refers to pores with pore sizes above 500 Å. The relative amounts of micropores, mesopores and macropores can be selected to immobilize diluent therein as an immobilizing material. Alternatively, activated carbon provided in filters of cigarettes for sorption of tobacco smoke constituents can be selected relative to the sizes of molecules of selected components from mainstream tobacco smoke that are to be targeted and removed. Thus, the pore sizes and pore distribution can be adjusted accordingly as needed for certain applications.

Another material which may be used as a sorbent is a molecular sieve zeolite. The term "molecular sieve" as used herein refers to a porous structure composed of an inorganic silicate material. Zeolites have channels or pores of uniform, molecular sized dimensions. There are many known unique zeolite structures having different sized and shaped channels or pores. The size and shape of the channels or pores can significantly affect the properties of these materials with regard to sorption and separation characteristics.

Zeolite-type molecular sieves include ZSM-5, A, X, and Y-type zeolites, as well as silicoaluminophosphates and mesoporous molecular sieves, such as MCM-41, MCM-48 and SBA-15. These can be granular materials. This family of materials contains regular arrays of uniformly-sized channels and tunable internal active sites, and can admit molecules below a certain size into their internal space. Microporous, mesoporous and/or macroporous molecular sieves may be used.

Silica gels can also be used as sorbents. One example is the commercially available Davisil granular silica gels (manufactured by Grace Davison of Columbia, Md.) with average pore size of 40 angstroms, 60 angstroms, 90 angstroms and 150 angstroms. The particle size of the Davisil granules is about 35×60 mesh (i.e., a range of particle sizes from about 0.25 mm to about 0.5 mm in transverse dimension).

The porosity of the sorbents can be measured by Argon adsorption isotherms for example. The Argon adsorption isotherms of these silica gel samples can be measured using a Micromeritics Adsorption Porosimeter, wherein the BET (Bruner, Emmett, and Teller) specific surface areas and pore size distributions can be calculated based upon the isotherms.

Exemplary loading of diluents on silica gels are shown in Table 2 below. For Table 2, silica and diluent are in a sealed container and placed in a convection oven at a temperature of 70° C. for 15 hours, wherein the sealed containers were periodically removed from the oven, mixed and placed back into the oven during heating to fully impregnate and immobilize diluent in the silica gel. After this impregnation and immobilization process, the particles of some samples were found to no longer be free flowing due to the excessive loading of the liquid diluents. The maximum loading was determined by the sample which contained the highest diluents loading among the free-flowing samples. The BET specific surface areas, pore volumes and maximum loading (in wt % silica) of glycerin (GLY) and propylene glycol (PG) for these exemplary silica gels are listed in Table 2.

TABLE 2

Adsorption capacity of exemplary silica gels

| | Average pore size (Å) | | |
|---|---|---|---|
| | 40 | 60 | 150 |
| Pore volume (cc/g) | 0.65 | 0.75 | 1.10 |
| BET specific area (m²/g) | 675 | 480 | 300 |
| Max gly. loading (wt % of silica) | — | 80% | 120% |
| Max PG loading (wt % of silica) | — | 67% | 100% |

Table 2 shows that the pore volume increases and the BET specific surface area decreases as the average pore size increases. For the samples of Table 2, silica gel with average pore size of 150 Å was used for testing because of its high loading capacity, wherein the loading capacity of a given silica gel is directly related to the pore volume, wherein the larger the pore volume, the higher the loading capacity of the silica gel.

While not wishing to be bound by theory, it is believed that glycerin absorbed by the silica gels listed in Table 2 has a higher weight loading than that of propylene glycol due to the higher density of glycerin (the density of glycerin is about 1.25 g/cc whereas the density of propylene glycol is about 1.05 g/cc). It is further noted that the maximum volumetric loadings of glycerin and propylene glycol are about the same.

Figure 3:
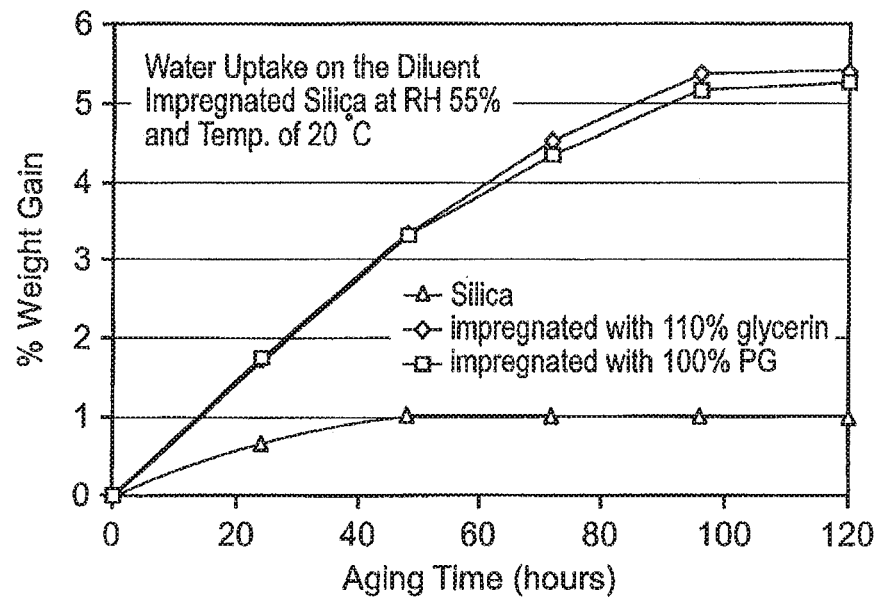
FIG. 3 illustrates water absorption in exemplary immobilized diluents.

Exemplary immobilized diluents absorb moisture in that both the immobilizing material and the diluents can both tend to absorb moisture (i.e., hygroscopic), thus the immobilized diluents can be prone to absorb moisture. In an exemplary embodiment, glycerin- and PG-impregnated silica are shown to absorb moisture during ageing. In an exemplary embodiment, Davisil 646, 150 Å pore size silica gels were pre-impregnated with 110 wt % and 100 wt % glycerin and PG, respectively. The impregnated samples were exposed to the atmosphere with a controlled humidity of 55%, wherein the percent weight gain (mostly due to the uptake of moisture) was monitored daily. As illustrated in FIG. 3, the percent weight gain over time, which was measured as the water uptake on the diluent impregnated silica, stabilized at about 1% for the silica and about 5% for both glycerin-impregnated and PG-impregnated silica gels at a room humidity of 55% and a temperature of 20° C.

It is noted that sorbent mixtures can also be used to provide combinations of immobilization properties of diluents and/or filtration characteristics to immobilize diluents and/or achieve a targeted filtered mainstream smoke composition, if desired.

E. Smoking Articles

It is envisioned that immobilized diluents may be used in smoking articles. The term "smoking articles" is intended to include elongated smoking articles, such as cigarettes and cigars. Non-traditional cigarettes such as cigarettes for electrical smoking systems are also included in the definition of smoking articles or cigarettes generally.

The amount of immobilized diluents in smoking articles can be selected by balancing the level of diluent effects with the mass of the smoking articles such that the taste and feel of the smoking articles are not substantially changed by the addition of immobilized diluents. In exemplary embodiments, between 1 and 300 mg or between 50 and 150 mg of immobilized diluents (including both the immobilizing material and the diluents) can be used in a cigarette, which can have about 500-700 mg of tobacco filler therein. It is noted that the level of diluent is limited by the combustibility of the tobacco with the immobilized diluents therein. For example, about 1 to about 40 wt % diluent or about 10 to about 30 wt % diluent can be included within an exemplary cigarette, such that sufficient levels of tobacco are present to allow continuous combustion of the tobacco in the cigarette.

Immobilized diluents can be provided in tobacco filler. By providing immobilized diluents in tobacco filler, the immobilized diluents can be heated by combustion of the tobacco and the diluents can be released from the immobilizing material.

Figure 4:
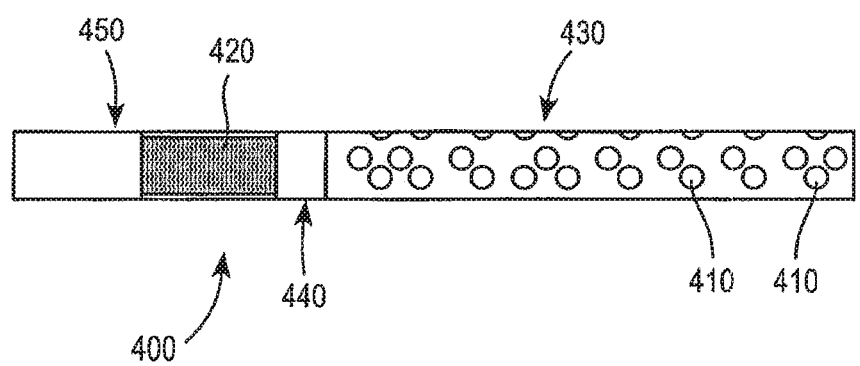
FIG. 4 illustrates an exemplary cigarette with immobilized diluents therein.

Exemplary smoking articles, as illustrated in FIG. 4, can be used with immobilized diluents 410. As illustrated in FIG. 4, a cigarette 400 can contain two sections, a tobacco-containing portion sometimes referred to as the tobacco or cigarette rod 430, and a filter portion 450 with sorbent 220 located between and/or surrounded by filter material 440, such as cellulose acetate (CA). The filter portion can be surrounded by tipping paper, which forms a mouth end of the cigarette. The tipping paper can overlap with the tobacco rod in order to hold the filter and tobacco rod 430 together. The tobacco rod 430, or tobacco containing element of the cigarette, can include immobilized diluent mixed uniformly or non-uniformly within tobacco filler, as discussed above. Additionally, a paper wrapper surrounding the tobacco rod 430 can be provided, wherein an adhesive can be used to hold the seams of the paper wrapper together.

In the exemplary cigarette 400 of FIG. 4, the sorbent 420, which can be the same or different from the immobilizing material sorbent, is included in a filter of the cigarette 400. By including sorbent in smoking articles, levels of targeted constituents of mainstream smoke, such as benzene, acrolein or 1,3-butadiene can be reduced; however, levels of non-targeted constituents, such as natural flavor constituents or diluents added directly to tobacco filler for their aerosol forming properties, can also be reduced due to the adsorption by the sorbent. By providing diluents within immobilizing material, diluents can be provided in an isolated manner from the sorbent during storage (or prior to release from the immobilizing material) thus reducing sorption of diluents by the sorbent during storage.

The term "smoking" is intended to include the heating, combusting or otherwise causing of a release of certain chemicals from tobacco. Generally, smoking of cigarettes involve lighting one end of a cigarette and drawing mainstream smoke downstream through a mouth end of the cigarette. Alternatively, smoking of non-traditional cigarettes or other smoking articles may be smoked by other means.

The term "mainstream smoke" includes the mixture of gases and/or aerosols passing down a smoking article, such as a tobacco rod, and issuing from an end, such as through the filter end, i.e., the smoke issuing or drawn from the mouth end of a cigarette during smoking of the cigarette. It is noted that in a cigarette, for example, the mainstream smoke contains air that is drawn in through the heated region of the cigarette and through a paper wrapper surrounding the cigarette.

A non-traditional cigarette typically contains the same two sections with a tobacco-containing portion (tobacco rod) and a filter portion. However, unlike a traditional cigarette wherein the tobacco rod comprises cut filler, the tobacco-containing portion of a non-traditional cigarette includes a tobacco plug of cut filler wrapped within a tobacco mat. Typically, the tobacco mat includes tobacco therein, and is used to form a hollow tube around the tobacco plug, wherein the tobacco mat is heated by heating blades of a non-traditional cigarette smoking system.

Non-traditional cigarettes include, for example, cigarettes for electrical smoking systems as described in commonly-assigned U.S. Pat. Nos. 6,026,820; 5,988,176; 5,915,387; 5,692,526; 5,692,525; 5,666,976; and 5,499,636, the disclosures of which are incorporated by reference herein in their entireties. In an exemplary embodiment, the immobilized diluents can be provided within the tobacco-containing portion (tobacco rod) of a non-traditional cigarette, and can operate in a manner similar to traditional cigarettes.

In the filter portion of a traditional or non-traditional cigarette, sorbents can be incorporated for the sorption of targeted tobacco smoke constituents. As mentioned above, these sorbents can be the same or different from the sorbents used as immobilizing material. For example, the sorbent can be activated carbon, zeolite, other molecular sieves, polyaromatic resins (e.g., PMMA, benzene type resins, phenolic resins, microsponges and super-absorbents), sorbents located in fibrous filter material, or combinations thereof.

Sorbent can be incorporated in a cigarette filter at one or more desired locations. For example, a sorbent segment, such as sorbent particulate in a cavity or sorbent in filter material (e.g., carbon-on-tow), can be combined with a free-flow filter. The sorbent can be in contact with (i.e., abut) a free-flow filter positioned between the free-flow filter and a mouthpiece filter plug or in contact with (i.e., abut) a mouthpiece filter plug. The sorbent segment can have a diameter substantially equal to that of the outer diameter of a free-flow filter to minimize by-pass of smoke during the filtration process. The filter can also include a sorbent in oriented or non-oriented fibers and a sleeve, such as paper, surrounding the fibers.

Fibrous sorbent-containing filter segments can have a high loft with a suitable packing density and fiber length such that parallel pathways are created between fibers. Such structure can effectively remove selected gas-phase constituents, such as formaldehyde and/or acrolein, while removing minimal amounts of particulate matter from the smoke, thereby achieving a significant reduction of the selected gas-phase constituents, while not significantly affecting the TPM in the tobacco smoke. A low packing density and a short fiber length can be used to achieve such filtration performance.

The amount of sorbent used in filters in exemplary embodiments of the smoking article depends on the type and the amount of selected gas-phase constituents in the tobacco smoke.

Examples of suitable types of tobacco materials that can be used in a smoking article including immobilized diluents include, but are not limited to, flue-cured tobacco, Burley tobacco, Maryland tobacco, Oriental tobacco, rare tobacco, specialty tobacco, blends thereof and the like. The tobacco material may be provided in any suitable form, including, but not limited to, tobacco lamina, processed tobacco materials, aged tobacco such as volume expanded or puffed tobacco, processed tobacco stems, such as cut-rolled or cut-puffed stems, reconstituted tobacco materials, blends thereof, and the like. Tobacco substitutes may also be used.

In traditional cigarette manufacture, the tobacco is normally used in the form of cut filler, i.e., in the form of shreds or strands cut into widths ranging from about 2 mm to about 1 mm or even about 0.5 mm. The lengths of the strands range from between about 5 mm to about 80 mm. An exemplary cigarette can include between about 300-750 mg of tobacco, preferably around 550 mg for a standard cigarette. The cigarettes may further comprise one or more flavors, or other suitable diluents (e.g., burn diluents, combustion modifying agents, coloring agents, binders, etc.).

F. Example

In an exemplary embodiment, exemplary activated carbon containing cigarettes, similar to those illustrated in FIG. 4, with tar values of 11-mg and 6-mg are provided. These exemplary cigarettes include a 49 mm tobacco rod and a 34 mm filter rod and optionally an 8 mm of activated carbon beads in a plug-space-plug configuration, as illustrated in FIG. 5.

Glycerin-impregnated silica gel (the silica gel being referred to in this example generally as "silica") with maximum glycerin loading (made from a 12:10 glycerin to silica weight ratio) is provided within the tobacco rod of the exemplary cigarettes. Eight samples are constructed by adding either 110 mg or 220 mg of glycerin-impregnated silica gel into the tobacco rod of the exemplary cigarettes. The weight of tobacco filler was fixed at 550 mg for all the exemplary cigarettes. Illustrations of the exemplary cigarettes, as prepared, and their corresponding sample codes are shown in FIG. 5 and some of the results of testing are listed in Tables 3-15.

Table 3 lists the results of puff count, TPM, tar, nicotine, water, glycerin and percent glycerin transfer corresponding to the exemplary cigarettes and their sample codes illustrated in FIG. 5.

to about 5.6% transfer of glycerin in the exemplary control cigarettes. The listed percent glycerin in the tobacco rod transferred into mainstream smoke was calculated using the following equation:

TABLE 3

TPM, tar, water, nicotine, glycerin and percent glycerin transfer

| Cigarette | Cig. Code | Cigarette Description | Puff Count | TPM[1] (mg/cigt) | Tar[2] (mg/cigt) | Nicotine (mg/cigt) | Water (mg/cigt) | Glycerin (mg/cigt) | Smoke Tar[4] (mg/cigt) | Glycerin (% Trans.) |
|---|---|---|---|---|---|---|---|---|---|---|
| 11-mg tar | A-01 | Control (8 mm C-Beads in | 6.2 | 11.40 | 9.40 | 0.74 | 1.28 | 1.06 | 8.34 | 4.24 |
| | A-02 | 110 mg (Silica + glycerin) in filler | 8.2 | 14.00 | 11.20 | 0.74 | 2.10 | 4.78 | 6.42 | 6.62 |
| | A-03 | 220 mg (Silica + glycerin) in filler | 9.7 | 13.90 | 11.10 | 0.63 | 2.17 | 7.01 | 4.09 | 4.83 |
| | A-04 | 50 mg (Silica only) in filler | 7.2 | 9.10 | 7.40 | 0.64 | 1.06 | 0.94 | 6.46 | 3.76 |
| | A-06 | 100 mg (Silica only) in filler | 8.5 | 8.40 | 6.90 | 0.68 | 0.89 | 0.87 | 6.03 | 3.48 |
| | A-06 | 110 mg (Silica + glycerin) in filler, no carbon and empty cavity in filter | 8.4 | 18.00[3] | 14.10 | 0.88 | 3.02 | 3.16 | 10.95 | 3.71 |
| | A-07 | 220 mg (Silica + glycerin) in filter, no carbon and empty cavity in filter | 10.2 | 12.93[3] | 10.12 | 0.68 | 2.13 | 3.62 | 6.60 | 2.50 |
| | A-08 | 110 mg (Silica + glycerin) in filler, carbon replaced by CA | 8.7 | 13.97 | 11.16 | 0.72 | 2.09 | 2.34 | 8.82 | 2.76 |
| | A-09 | 220 mg (Silica + glycerin) in filler, carbon replaced by CA | 9.8 | 13.30 | 10.72 | 0.65 | 1.93 | 3.09 | 7.63 | 2.13 |
| 6-mg Tar | B-01 | Control (8 mm C-Beads in | 6.7 | 6.10 | 4.00 | 0.74 | 1.28 | 0.63 | 3.37 | 2.52 |
| | B-02 | 110 mg (Silica + glycerin) in filler | 9.7 | 5.70 | 4.60 | 0.37 | 0.75 | 1.38 | 3.22 | 1.62 |
| | B-03 | 220 mg (Silica + glycerin) in filler | 11.3 | 4.60 | 3.60 | 0.28 | 0.69 | 1.65 | 1.95 | 1.14 |
| | B-04 | 50 mg (Silica only) in filler | 8.0 | 4.60 | 3.70 | 0.36 | 0.61 | 0.49 | 3.21 | 1.96 |
| | B-05 | 100 mg (Silica only) in filler | 8.9 | 3.50 | 2.80 | 0.27 | 0.40 | 0.39 | 2.41 | 1.56 |
| | B-06 | 110 mg (Silica + glycerin) in filler, no carbon and empty cavity in filter | 9.9 | 6.10 | 5.00 | 0.37 | 0.72 | 1.04 | 3.96 | 1.22 |
| | B-07 | 220 mg (Silica + glycerin) in filler, no carbon and empty cavity in filter | 12.1 | 4.67 | 3.78 | 0.26 | 0.62 | 1.05 | 2.73 | 0.72 |
| | B-08 | 110 mg (Silica + glycerin) in filler, carbon replaced by CA | 9.3 | 4.93 | 4.04 | 0.30 | 0.59 | 0.93 | 3.11 | 1.09 |
| | B-09 | 220 mg (Silica + glycerin) in filler, carbon replaced by CA | 11.8 | 4.17 | 3.40 | 0.24 | 0.64 | 0.83 | 2.57 | 0.57 |

[1]TPM numbers listed here were collected in the experiments for the analyses of tar, nicotine and water. TPM used for the measurement of glycerin concentration were collected in separate experiments and are not listed in the table.
[2]Glycerin is included in tar.
[3]The difference between the TPM here and the TPM obtained in the experiments for the glycerin analysis is statistically significant.
[4]Smoke tar is equal to tar minus glycerin.

Results showed that for both 11-mg tar and 6-mg tar cigarettes, the puff count increases when either plain silica or glycerin-impregnated silica are added into the tobacco rod. Since silica does not combust, the increased puff count seems to indicate that the smoldering rate is reduced due to the presence of silica. The puff count, which is the number of puffs taken on a cigarette smoked to a prescribed butt length under standardized smoking conditions, appears to be further increased when glycerin-impregnated silica is added into the tobacco rod. This may be attributed to an increased total combustible mass (i.e., tobacco and glycerin) in the tobacco rod.

The addition of plain silica in the tobacco rod decreased the TPM for both 11-mg tar and 6-mg tar cigarettes in spite of the fact that it increased the puff count.

It is believed that when the glycerin is in the tobacco rod immobilized by silica, a combination of two competing effects on TPM is expected: the first, increased TPM due to the presence of glycerin; and the second, decreased TPM due to the presence of silica. As a result of testing, an increase in the TPM is observed for the 11-mg tar exemplary cigarettes whereas a small decrease in TPM is observed for the 6-mg tar cigarette. While not wishing to be bound by theory, it appears that as the ventilation increases (with the lower tar content cigarette), the increase in the TPM level due to the addition of glycerin in the tobacco rod is reduced, and therefore the decrease of TPM due to the presence of silica in the tobacco appears to become more significant.

Table 3 lists the percent of glycerin in the tobacco rod transferred into the mainstream smoke. The tobacco filler used in the exemplary cigarettes contained about 30 to about 150 mg of glycerin, which can be used to achieve about 0.5

$$\% \text{ Transfer} = \frac{\text{Wt. of Diluent in } TPM}{\text{Wt. of Diluent in Silica} + \text{Wt. of Diluent in Tobacco}} \times 100$$

Figure 6A:
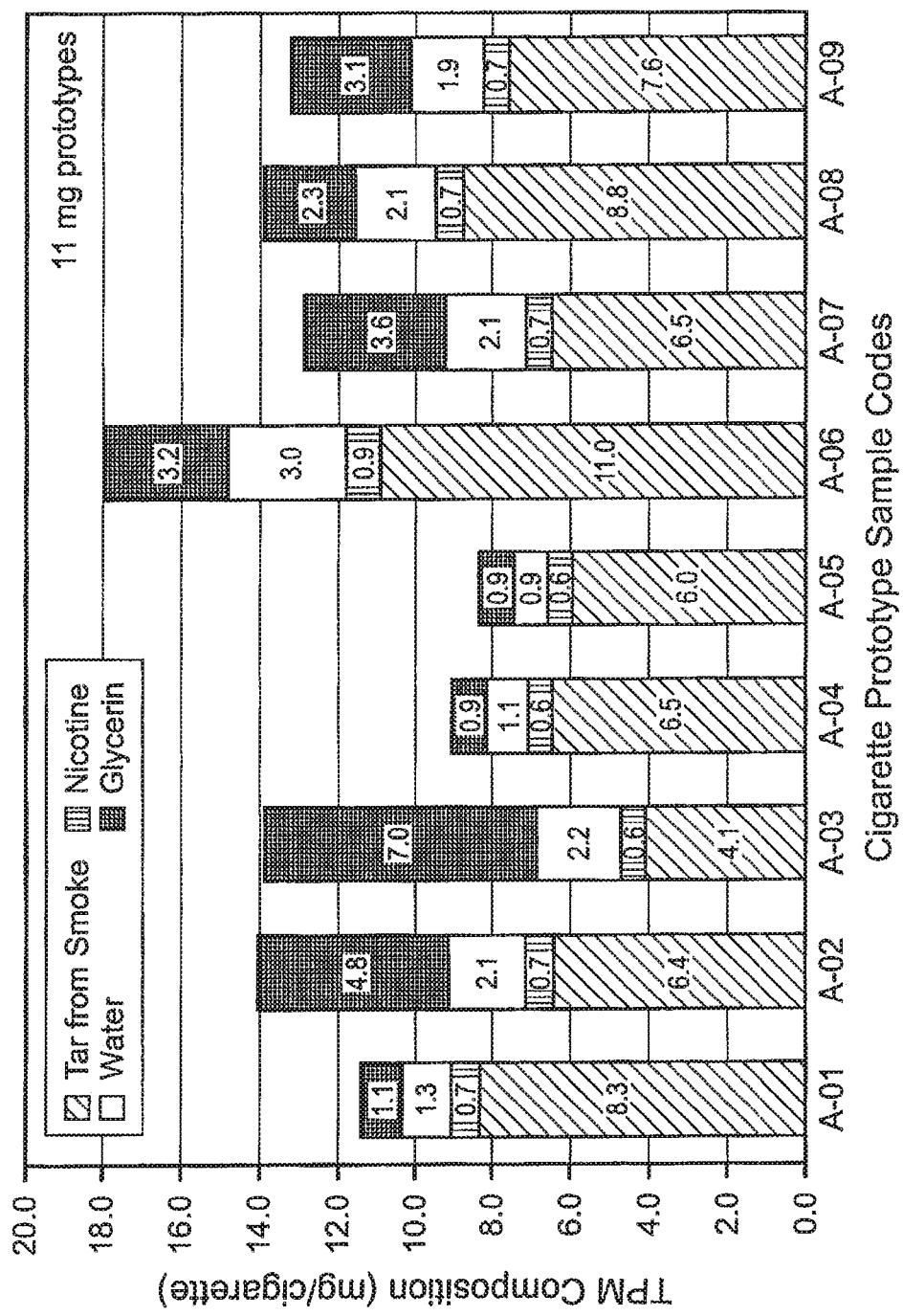
FIGS. 6A and 6B illustrate the TPM composition of exemplary cigarettes.
Figure 6B:
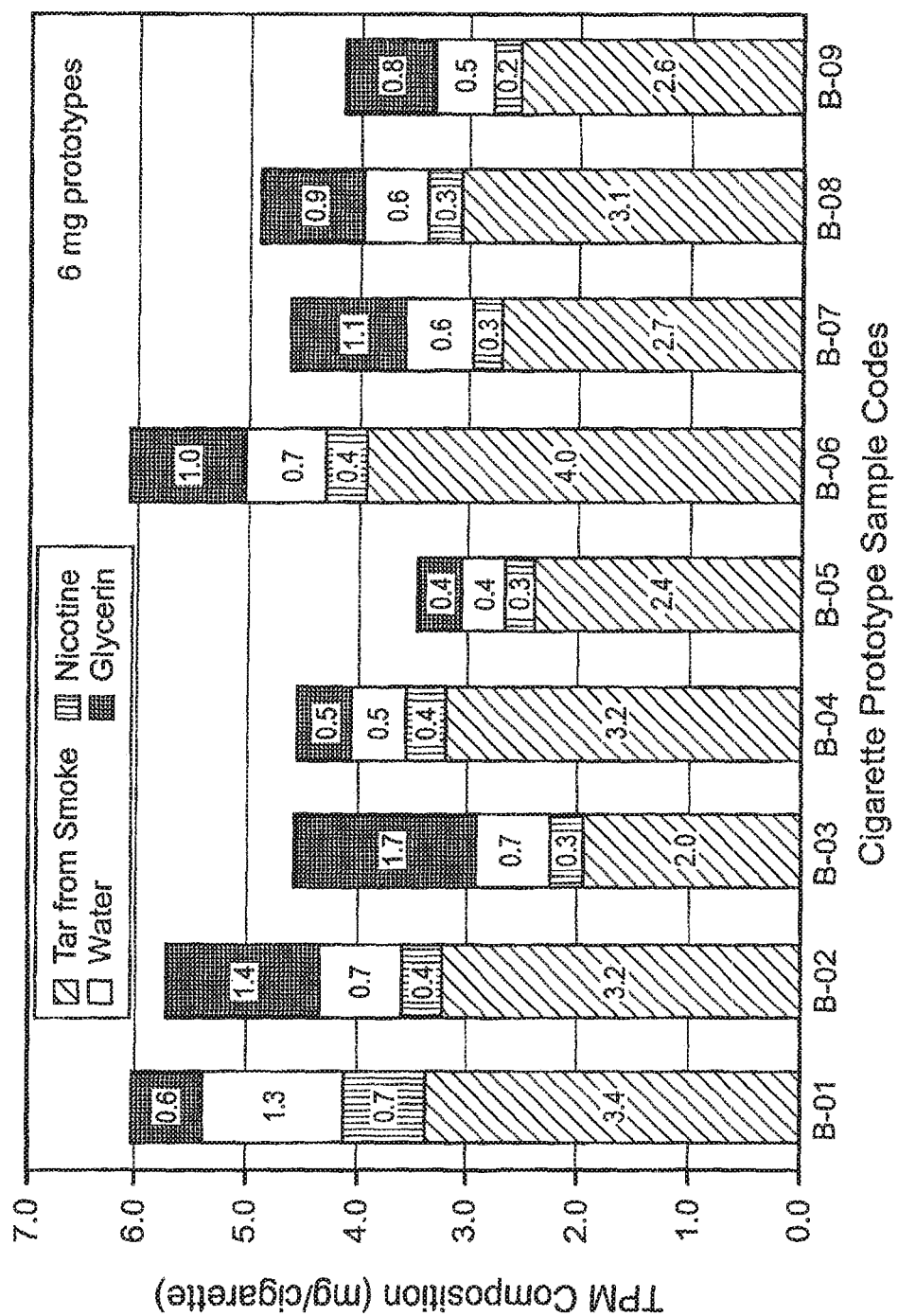

The compositions of the TPM for the exemplary cigarettes are also graphically illustrated in FIG. 6A (sample codes starting with "A" indicating 11-mg tar exemplary cigarettes) and FIG. 6B (sample code starting with "B" indicating 6-mg tar exemplary cigarettes). As should be expected, the quantity of glycerin in the TPM increases with the addition of glycerin in the cigarette filler. However, as illustrated in FIG. 6A, even though the quantity of glycerin in TPM increases with the addition of the glycerin-impregnated silica, no significant change in the transfer percentage of glycerin for the 11-mg tar exemplary cigarettes (see A-02 and A-03 as compared with the A-01) can be seen. In addition, with respect to the 6-mg tar exemplary cigarettes, as illustrated in FIG. 6B, the transfer percentage of glycerin decreases with the addition of glycerin-impregnated silica.

Additionally, the use of activated carbon sorbent in a filter of the cigarette can also affect the TPM (and glycerin transfer). As illustrated in FIG. 6A and FIG. 6B, the 11-mg tar and the 6-mg tar exemplary cigarettes display a decrease in the quantity of glycerin in TPM as well as the percent glycerin transfer when activated carbon is removed or replaced with cellulose acetate filter (for example, see A-02 compared with A-06 and A-08).

Figure 7A:
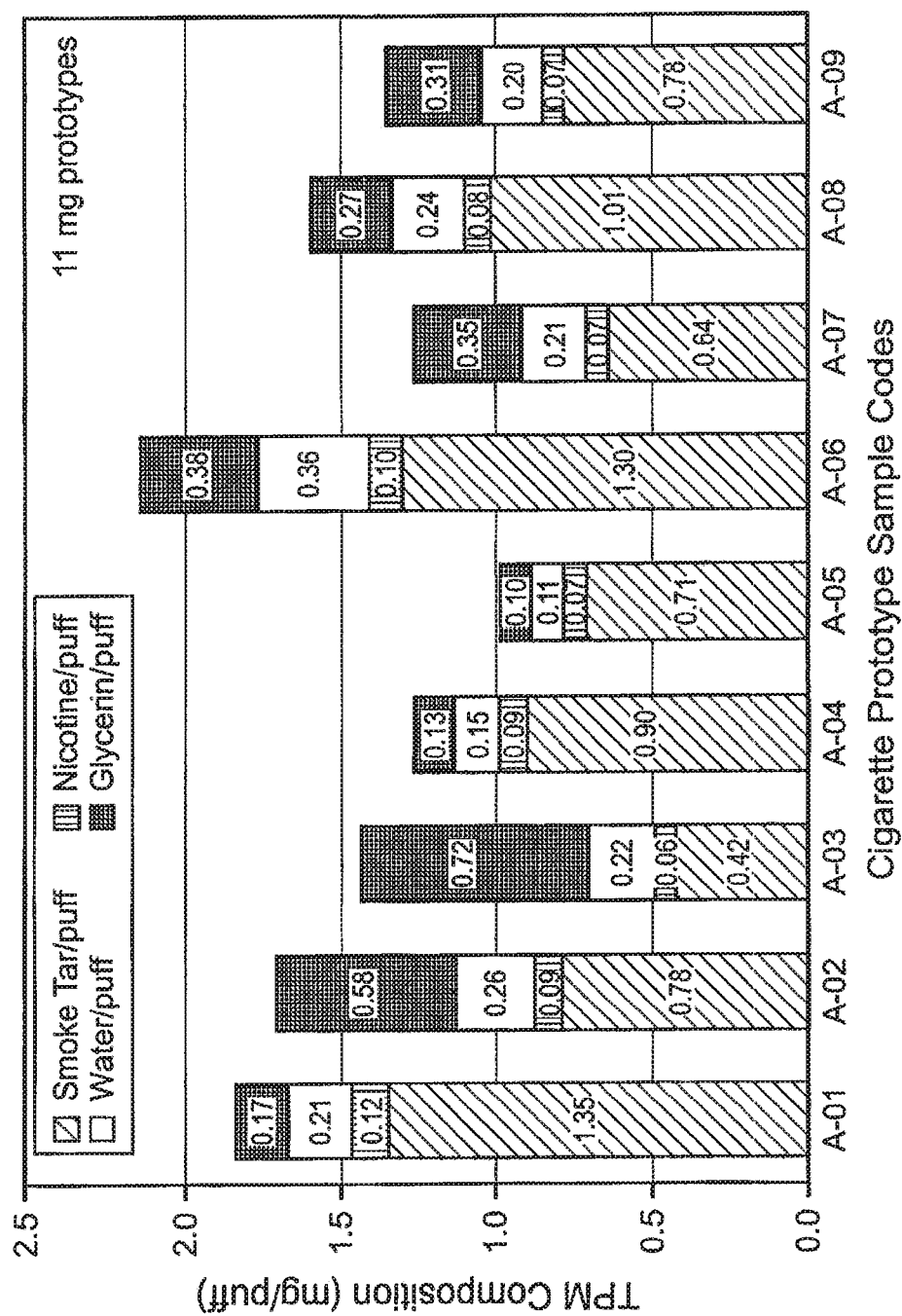
FIGS. 7A and 7B illustrate the TPM composition of exemplary cigarettes on a per puff basis.
Figure 7B:
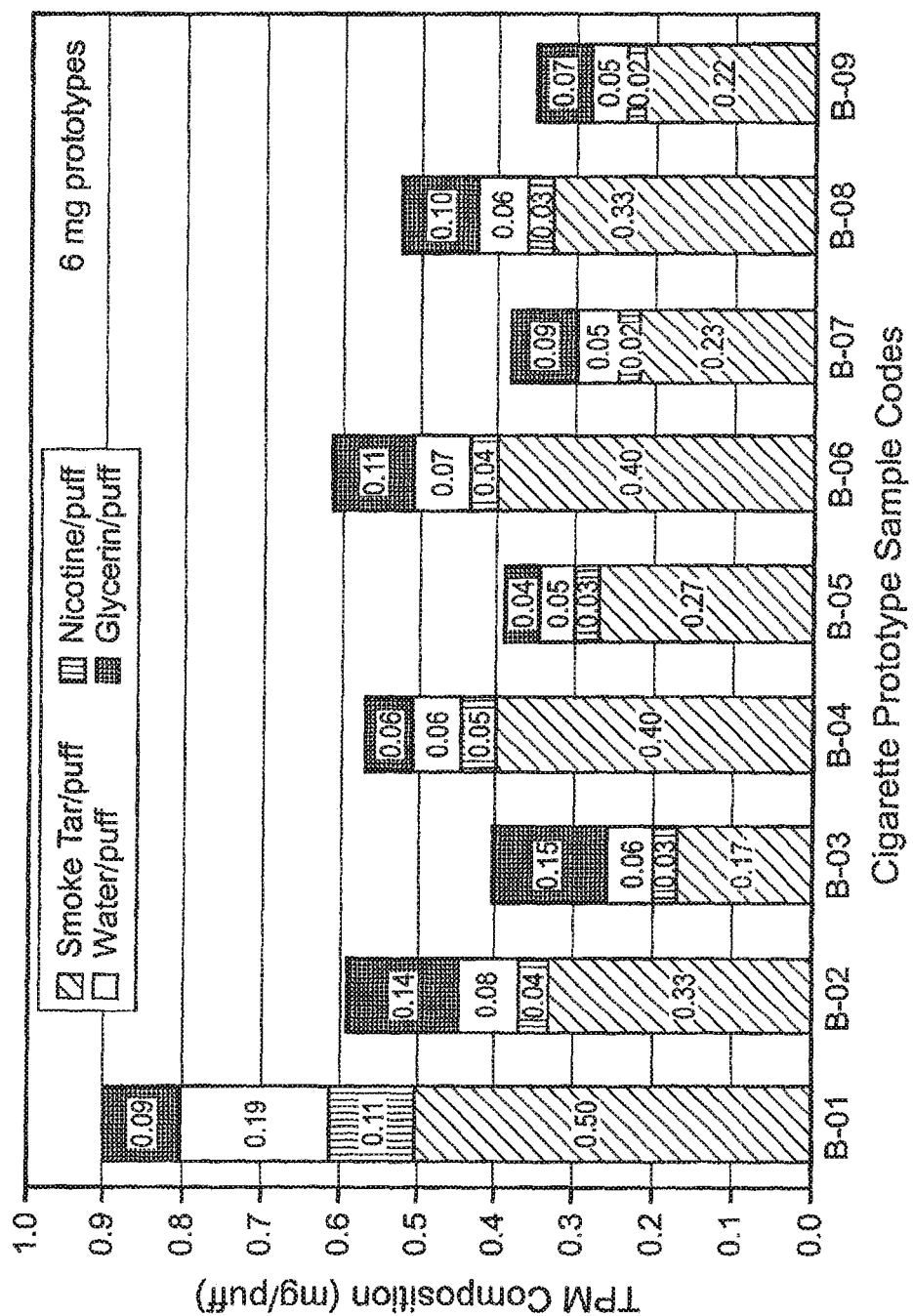

The TPM, tar, nicotine, water and glycerin for the same exemplary cigarettes from Table 3 and FIGS. 6A and 6B are set forth on a puff basis in Table 4, FIG. 7A and FIG. 7B.

TABLE 4

TPM, Tar, water, nicotine and glycerin per puff

| Cigarette | Cig. Code | Cigarette Description | Puff Count | TPM/puff[1] (mg/puff) | Tar/puff[2] (mg/puff) | Nic./puff (mg/puff) | Wat./puff (mg/puff) | Gly./puff (mg/puff) | S-tar/puff[3] (mg/puff) |
|---|---|---|---|---|---|---|---|---|---|
| 11-mg tar | A-01 | Control (8 mm C-Beads in Filter) | 6.2 | 1.84 | 1.52 | 0.12 | 0.21 | 0.17 | 1.35 |
| | A-02 | 110 mg (Silica + glycerin) in filler | 8.2 | 1.71 | 1.37 | 0.09 | 0.26 | 0.58 | 0.78 |
| | A-03 | 220 mg (Silica + glycerin) in filler | 9.7 | 1.43 | 1.14 | 0.06 | 0.22 | 0.72 | 0.42 |
| | A-04 | 50 mg (Silica only) in filler | 7.2 | 1.26 | 1.03 | 0.09 | 0.15 | 0.13 | 0.90 |
| | A-05 | 100 mg (Silica only) in filler | 8.5 | 0.99 | 0.81 | 0.07 | 0.11 | 0.10 | 0.71 |
| | A-06 | 110 mg (Silica + glycerin) in filler, no carbon and empty cavity in filter | 8.4 | 2.14 | 1.68 | 0.10 | 0.36 | 0.38 | 1.30 |
| | A-07 | 220 mg (Silica + glycerin) in filler, no carbon and empty cavity in filter | 10.2 | 1.27 | 0.99 | 0.07 | 0.21 | 0.35 | 0.64 |
| | A-08 | 110 mg (Silica + glycerin), carbon replaced by CA | 8.7 | 1.60 | 1.28 | 0.08 | 0.24 | 0.27 | 1.01 |
| | A-09 | 220 mg (Silica + glycerin), carbon replaced by CA | 9.8 | 1.35 | 1.09 | 0.07 | 0.20 | 0.31 | 0.78 |
| 6-mg Tar | B-01 | Control (8 mm C-Beads in Filter) | 6.7 | 0.91 | 0.60 | 0.11 | 0.19 | 0.09 | 0.50 |
| | B-02 | 110 mg (Silica + glycerin) in filler | 9.7 | 0.59 | 0.47 | 0.04 | 0.08 | 0.14 | 0.33 |
| | B-03 | 220 mg (Silica + glycerin) in filler | 11.3 | 0.41 | 0.32 | 0.03 | 0.06 | 0.15 | 0.17 |
| | B-04 | 50 mg (Silica only) in filler | 8.0 | 0.58 | 0.46 | 0.05 | 0.06 | 0.06 | 0.40 |
| | B-05 | 100 mg (Silica only) in filler | 8.9 | 0.39 | 0.31 | 0.03 | 0.05 | 0.04 | 0.27 |
| | B-06 | 110 mg (Silica + glycerin) in filler, no carbon and empty cavity in filter | 9.9 | 0.62 | 0.51 | 0.04 | 0.07 | 0.11 | 0.40 |
| | B-07 | 220 mg (Silica + glycerin) in filler, no carbon and empty cavity in filter | 12.1 | 0.39 | 0.31 | 0.02 | 0.05 | 0.09 | 0.23 |
| | B-08 | 110 mg (Silica + glycerin), carbon replaced by CA | 9.3 | 0.53 | 0.43 | 0.03 | 0.06 | 0.10 | 0.33 |
| | B-09 | 220 mg (Silica + glycerin), carbon replaced by CA | 11.8 | 0.35 | 0.29 | 0.02 | 0.05 | 0.07 | 0.22 |

[1] TPM numbers listed here were collected in the experiments for the analyses of tar, nicotine and water. TPM used for the measurement of glycerin concentration were collected in separate experiments and are not listed in the table.
[2] Glycerin is included in tar.
[3] Smoke tar is equal to tar minus glycerin.

With the exception of A-06 in FIG. 7A, the TPM/puff, tar/puff and nicotine/puff levels all decreased when either silica or glycerin-impregnated silica is added in the tobacco rod. As illustrated in FIG. 7A, the glycerin/puff of the 11-mg tar exemplary cigarettes increases as the glycerin-containing silica is added in the tobacco rod. This effect is less significant for the 6-mg tar exemplary cigarettes, as illustrated in FIG. 7B, probably due to the increased ventilation, as discussed above. The water/puff did not appear to change correspondingly with the nicotine/puff, which while not wishing to be bound by theory, is believed to be attributable to an increase in the amount of water in the tobacco rod due to the hygroscopic (water absorbing) nature of glycerin.

Tar, nicotine, water and glycerin for the same selected exemplary cigarettes were also measured based upon a TPM basis are shown in Table 5.

TABLE 5

Tar, water, nicotine and glycerin on TPM basis

| Cigarette | Cig. Code | Cigarette Description | Puff Count | TPM[1] (mg/cigt) | Tar/TPM[2] (mg/mg) | Nic./TPM (mg/mg) | Wat./TPM (mg/mg) | Gly./TPM (mg/mg) | S-Tar/TPM[4] (mg/mg) |
|---|---|---|---|---|---|---|---|---|---|
| 11-mg tar | A-01 | Control (8 mm C-Beads in Filter) | 6.2 | 11.40 | 0.82 | 0.07 | 0.11 | 0.09 | 0.73 |
| | A-02 | 110 mg (Silica + glycerin) in filler | 8.2 | 14.00 | 0.80 | 0.05 | 0.15 | 0.34 | 0.46 |
| | A-03 | 220 mg (Silica + glycerin) in filler | 9.7 | 13.90 | 0.80 | 0.05 | 0.16 | 0.50 | 0.29 |
| | A-04 | 50 mg (Silica only) in filler | 7.2 | 9.10 | 0.81 | 0.07 | 0.12 | 0.10 | 0.71 |
| | A-05 | 100 mg (Silica only) in filler | 8.5 | 8.40 | 0.82 | 0.07 | 0.11 | 0.10 | 0.72 |
| | A-06 | 110 mg (Silica + glycerin) in filler, no carbon and empty cavity in filter | 8.4 | 18.00[3] | 0.78 | 0.05 | 0.17 | 0.17 | 0.61 |
| | A-07 | 220 mg (Silica + glycerin) in filler, no carbon and empty cavity in filter | 10.2 | 12.93[3] | 0.78 | 0.05 | 0.16 | 0.28 | 0.50 |
| | A-08 | 110 mg (Silica + glycerin), carbon replaced by CA | 8.7 | 13.97 | 0.80 | 0.05 | 0.15 | 0.17 | 0.63 |
| | A-09 | 220 mg (Silica + glycerin), carbon replaced by CA | 9.8 | 13.30 | 0.81 | 0.05 | 0.15 | 0.23 | 0.57 |
| 6-mg Tar | B-01 | Control (8 mm C-Beads in Filter) | 6.7 | 6.10 | 0.66 | 0.12 | 0.21 | 0.10 | 0.55 |
| | B-02 | 110 mg (Silica + glycerin) in filler | 9.7 | 5.70 | 0.81 | 0.07 | 0.13 | 0.24 | 0.56 |
| | B-03 | 220 mg (Silica + glycerin) in filler | 11.3 | 4.60 | 0.78 | 0.06 | 0.15 | 0.36 | 0.42 |
| | B-04 | 50 mg (Silica only) in filler | 8.0 | 4.60 | 0.80 | 0.08 | 0.11 | 0.11 | 0.70 |
| | B-05 | 100 mg (Silica only) in filler | 8.9 | 3.50 | 0.80 | 0.08 | 0.12 | 0.11 | 0.69 |
| | B-06 | 110 mg (Silica + glycerin) in filler, no carbon and empty cavity in filter | 9.9 | 6.10 | 0.82 | 0.06 | 0.12 | 0.17 | 0.65 |
| | B-07 | 220 mg (Silica + glycerin) in filler, no carbon and empty cavity in filter | 12.1 | 4.67 | 0.81 | 0.06 | 0.13 | 0.22 | 0.58 |
| | B-08 | 110 mg (Silica + glycerin), carbon replaced by CA | 9.3 | 4.93 | 0.82 | 0.06 | 0.12 | 0.19 | 0.63 |

TABLE 5-continued

Tar, water, nicotine and glycerin on TPM basis

| Cigarette | Cig. Code | Cigarette Description | Puff Count | TPM[1] (mg/cigt) | Tar/TPM[2] (mg/mg) | Nic./TPM (mg/mg) | Wat./TPM (mg/mg) | Gly./TPM (mg/mg) | S-Tar/TPM[4] (mg/mg) |
|---|---|---|---|---|---|---|---|---|---|
| | B-09 | 220 mg (Silica + glycerin), carbon replaced by CA | 11.8 | 4.17 | 0.82 | 0.06 | 0.13 | 0.20 | 0.62 |

[1]TPM numbers listed here were collected in the experiments for the analyses of tar, nicotine and water. TPM used for the measurement of glycerin concentration were collected in separate experiments and are not listed in the table.
[2]Glycerin is included in tar.
[3]The difference between the TPM here and the TPM obtained in the experiments for the glycerin analysis is statistically significant.
[4]Tar excluding glycerin.

As shown in Table 5, the glycerin/TPM appears to increase significantly for A-02 and A-03 compared to the control A-01. The increase in glycerin/TPM appears to be less significant for the 6-mg tar exemplary cigarettes (B-02 and B-03 as compared with B-01) possibly due to increased ventilation, as discussed above. Table 5 also lists the values of tar from cigarette smoke per TPM (S-Tar/TPM). Again, a significant decrease in S-Tar/TPM for A-02 and A-03 can be observed as compared to the control A-01 possibly due to the dilution of glycerin while a less significant decrease in S-Tar/TPM for B-02 and B-03 is observed possibly due to the increased ventilation. The level of nicotine/TPM also appears to decrease when either silica or glycerin-silica is added in the tobacco rod.

Table 6 shows the carbonyls in gas vapor phase (GVP) on a TPM basis for the same selected exemplary cigarettes, while Table 7 shows the percent change in the carbonyls vs. the exemplary control cigarettes.

TABLE 6

Carbonyls per TPM

| Cigarette | Cig. Code | Cigarette Description | Formaldehyde (µg/mg) | Acetaldehyde (µg/mg) | Acetone (µg/mg) | Acrolein (µg/mg) | Propionaldehyde (µg/mg) | Crotonaldehyde (µg/mg) | MEK (µg/mg) | Butyraldehyde (µg/mg) |
|---|---|---|---|---|---|---|---|---|---|---|
| 11-mg tar | A-01 | Control (8 mm C-Beads in | 2.63 | 30.93 | 12.84 | 2.75 | 1.79 | 0.81 | 3.42 | 1.63 |
| | A-02 | 110 mg (Silica + glycerin) in filler | 1.88 | 19.94 | 7.86 | 4.45 | 1.56 | 0.41 | 1.74 | 1.29 |
| | A-03 | 220 mg (Silica + glycerin) in filler | 1.67 | 20.39 | 8.16 | 7.67 | 1.97 | 0.36 | 1.17 | 0.74 |
| | A-04 | 50 mg (Silica only) in filler | 2.28 | 30.23 | 13.02 | 4.66 | 2.03 | 0.69 | 3.42 | 1.45 |
| | A-05 | 100 mg (Silica only) in filler | 1.68 | 26.62 | 11.26 | 6.20 | 2.23 | 0.63 | 2.69 | 1.07 |
| 6-mg tar | B-01 | Control (8 mm C-Beads in | 1.91 | 31.48 | 15.80 | 2.76 | 2.18 | 0.58 | 3.66 | 2.04 |
| | B-02 | 110 mg (Silica + glycerin) in filler | 1.68 | 28.66 | 14.16 | 4.50 | 2.13 | 1.03 | 3.97 | 1.61 |
| | B-03 | 220 mg (Silica + glycerin) in filler | 1.36 | 19.48 | 10.26 | 6.77 | 1.87 | 0.22 | 1.43 | 0.58 |
| | B-04 | 50 mg (Silica only) in filler | 1.27 | 27.69 | 14.16 | 5.33 | 2.12 | 0.53 | 2.71 | 1.23 |
| | B-06 | 100 mg (Silica only) in filler | 1.92 | 36.16 | 20.99 | 7.19 | 3.34 | 1.04 | 3.32 | 1.89 |

TABLE 7

Percent change in Carbonyls per TPM vs. control

| Cigarette | Cig. Code | Cigarette Description | Formaldehyde (% Change) | Acetaldehyde (% Change) | Acetone (% Change) | Acrolein (% Change) | Propionaldehyde (% Change) | Crotonaldehyde (% Change) | MEK (% Change) | Butyraldehyde (% Change) |
|---|---|---|---|---|---|---|---|---|---|---|
| 11-mg tar | A-01 | Control (8 mm C-Beads in Filter) | 0.00 | 0.00 | 0.00 | 0.00 | 0.00 | 0.00 | 0.00 | 0.00 |
| | A-02 | 110 mg (Silica + glycerin) in filler | −26.74 | −35.53 | −38.84 | 61.46 | −13.20 | −49.01 | −49.10 | −20.92 |
| | A-03 | 220 mg (Silica + glycerin) in filler | −37.82 | −34.07 | −36.44 | 174.7 | 10.26 | −57.00 | −66.86 | −54.70 |
| | A-04 | 50 mg (Silica only) in filler | −9.89 | −2.27 | 1.37 | 66.42 | 13.41 | −14.07 | −0.04 | −10.90 |
| | A-05 | 100 mg (Silica only) in | −37.67 | −13.94 | −12.42 | 125.2 | 26.00 | −34.89 | −24.33 | −34.37 |
| 6-mg tar | B-01 | Control (8 mm C-Beads in Filter) | 0.00 | 0.00 | 0.00 | 0.00 | 0.00 | 0.00 | 0.00 | 0.00 |
| | B-02 | 110 mg (Silica + glycerin) in filler | −17.01 | −8.95 | −10.42 | 63.83 | −2.34 | 76.77 | 11.70 | −21.44 |
| | B-03 | 220 mg (Silica + glycerin) in filler | −28.62 | −38.11 | −36.05 | 146.2 | −14.24 | −62.46 | −69.70 | −71.50 |
| | B-04 | 50 mg (Silica only) in filler | −33.27 | −12.34 | −10.41 | 93.83 | −2.88 | −9.29 | −23.79 | −39.85 |
| | B-05 | 100 mg (Silica only) in | 0.36 | 11.67 | 32.90 | 161.4 | 53.13 | 78.59 | −6.59 | −7.81 |

For both 11-mg tar and 6-mg tar exemplary cigarettes, as shown in Tables 6 and 7, a decrease in formaldehyde in GVP can be found for all the exemplary cigarettes compared to the control. While not wishing to be bound by theory, it is believed that the reduction of formaldehyde may be due to the addition of silica gel alone in the tobacco rod.

Table 8 shows the volatile organic compounds (VOC) in GVP on a TPM basis for the selected exemplary cigarettes, and Table 9 shows the percent change in the VOC vs. exemplary control cigarettes.

TABLE 8

VOC per TPM

| Cigarette | Cig. Code | Cigarette Description | 1,3-Butadiene (μg/mg) | Isoprene (μg/mg) | Benzene (μg/mg) | Acrylonitrile (μg/mg) | Toluene (μg/mg) | Styrene (μg/mg) |
|---|---|---|---|---|---|---|---|---|
| 11-mg tar | A-01 | Control (8 mm C-Beads in Filter) | 1.08 | 10.08 | 1.15 | 0.29 | 1.95 | 0.20 |
| | A-02 | 110 mg (Silica + glycerin) in | 0.88 | 6.80 | 0.83 | 0.21 | 1.32 | 0.13 |
| | A-03 | 220 mg (Silica + glycerin) in | 0.87 | 6.57 | 0.79 | 0.20 | 1.23 | 0.12 |
| | A-04 | 50 mg (Silica only) in | 1.18 | 9.58 | 1.10 | 0.28 | 1.72 | 0.17 |
| | A-05 | 100 mg (Silica only) in filler | 1.17 | 9.20 | 1.19 | 0.29 | 1.90 | 0.19 |
| 6-mg tar | B-01 | Control (8 mm C-Beads in Filter) | 1.17 | 11.03 | 1.36 | 0.28 | 2.38 | 0.17 |
| | B-02 | 110 mg (Silica + glycerin) in | 0.99 | 7.64 | 1.05 | 0.23 | 1.80 | 0.13 |
| | B-03 | 220 mg (Silica + glycerin) in | 0.79 | 6.14 | 0.82 | 0.19 | 1.38 | 0.10 |
| | B-04 | 50 mg (Silica only) in | 1.03 | 8.28 | 1.07 | 0.24 | 1.74 | 0.13 |
| | B-05 | 100 mg (Silica only) in filler | 1.05 | 8.17 | 1.07 | 0.24 | 1.75 | 0.15 |

TABLE 9

Percent change in VOC per TPM vs. control

| Cigarette | Cig. Code | Cigarette Description | 1,3-Butadiene (% Change) | Isoprene (% Change) | Benzene (% Change) | Acrylonitrile (% Change) | Toluene (% Change) | Styrene (% Change) |
|---|---|---|---|---|---|---|---|---|
| 11-mg tar | A-01 | Control (8 mm C-Beads in Filter) | 0.00 | 0.00 | 0.00 | 0.00 | 0.00 | 0.00 |
| | A-02 | 110 mg (Silica + glycerin) in | −18.90 | −32.52 | −27.57 | −27.99 | −32.14 | −36.88 |
| | A-03 | 220 mg (Silica + glycerin) in | −19.54 | −34.77 | −31.30 | −30.75 | −36.80 | −42.54 |
| | A-04 | 50 mg (Silica only) in | 9.65 | −4.89 | −4.04 | −5.30 | −11.58 | −17.49 |
| | A-05 | 100 mg (Silica only) in filler | 8.17 | −8.67 | 3.70 | −1.80 | −2.59 | −7.60 |
| 6-mg tar | B-01 | Control (8 mm C-Beads in Filter) | 0.00 | 0.00 | 0.00 | 0.00 | 0.00 | 0.00 |
| | B-02 | 110 mg (Silica + glycerin) in | −15.37 | −30.75 | −22.60 | −17.05 | −24.57 | −25.80 |
| | B-03 | 220 mg (Silica + glycerin) in | −32.29 | −44.29 | −39.72 | −33.11 | −42.15 | −39.93 |
| | B-04 | 50 mg (Silica only) in | −12.07 | −24.92 | −21.58 | −16.09 | −26.76 | −23.80 |
| | B-05 | 100 mg (Silica only) in filler | −10.23 | −25.88 | −21.76 | −15.26 | −26.32 | −15.00 |

As shown in Tables 8 and 9, a decrease in VOC is observed for exemplary cigarettes A-02, A-03, B-02 and B-03 compared to their control counterparts, implying that the inclusion of glycerin in the filler does not contribute to the VOC present in mainstream smoke.

Table 10 shows the polycyclic aromatic hydrocarbons (PAHs) in particular phase on a TPM basis for the selected exemplary cigarettes. Table 11 shows the percent change in the PAHs vs. exemplary control cigarettes.

TABLE 10

PAHs per TPM

| Cigarette | Cig. Code | Cigarette Description | Puff Count | TPM (mg/cigt) | B[a]A/TPM (ng/mg) | B[a]P/TPM (ng/mg) |
|---|---|---|---|---|---|---|
| 11-mg tar | A-01 | Control (8 mm C-Beads in Filter) | 6.23 | 12.23 | 0.76 | 0.49 |
| | A-02 | 110 mg (Silica + glycerin) in filler | 8.17 | 14.37 | 1.17 | 0.80 |
| | A-03 | 220 mg (Silica + glycerin) in filler | 9.73 | 14.53 | 1.38 | 0.95 |
| | A-04 | 50 mg (Silica only) in filler | 7.23 | 10.37 | 1.19 | 0.77 |
| | A-05 | 100 mg (Silica only) in filler | 8.03 | 8.60 | 1.72 | 1.12 |
| 6-mg tar | B-01 | Control (8 mm C-Beads in Filter) | 7.57 | 6.63 | 0.87 | 0.60 |
| | B-02 | 110 mg (Silica + glycerin) in filler | 9.20 | 6.87 | 1.16 | 0.78 |
| | B-03 | 220 mg (Silica + glycerin) in filler | 10.77 | 5.63 | 1.37 | 0.91 |
| | B-04 | 50 mg (Silica only) in filler | 7.87 | 4.97 | 1.83 | 1.18 |
| | B-05 | 100 mg (Silica only) in filler | 8.77 | 3.53 | 2.83 | 1.76 |

TABLE 11

Percent change in PAHs per TPM vs. control

| Cigarette | Cig. Code | Cigarette Description | Puff Count | TPM (mg/cigt) | B[a]A (% change) | B[a]P (% change) |
|---|---|---|---|---|---|---|
| 11-mg tar | A-01 | Control (8 mm C-Beads in Filter) | 6.23 | 12.23 | 0.00 | 0.00 |
| | A-02 | 110 mg (Silica + glycerin) in filler | 8.17 | 14.37 | 53.85 | 62.70 |
| | A-03 | 220 mg (Silica + glycerin) in filler | 9.73 | 14.53 | 81.38 | 92.47 |
| | A-04 | 50 mg (Silica only) in filler | 7.23 | 10.37 | 56.24 | 57.12 |
| | A-05 | 100 mg (Silica only) in filler | 8.03 | 8.60 | 126.09 | 127.49 |
| 6-mg tar | B-01 | Control (8 mm C-Beads in Filter) | 7.57 | 6.63 | 0.00 | 0.00 |
| | B-02 | 110 mg (Silica + glycerin) in filler | 9.20 | 6.87 | 32.32 | 29.56 |
| | B-03 | 220 mg (Silica + glycerin) in filler | 10.77 | 5.63 | 56.42 | 61.80 |
| | B-04 | 50 mg (Silica only) in filler | 7.87 | 4.97 | 109.51 | 96.14 |
| | B-05 | 100 mg (Silica only) in filler | 8.77 | 3.53 | 224.08 | 192.86 |

As shown above in Tables 10 and 11, the modified exemplary cigarettes showed increases in PAHs compared to their control counterparts. For the exemplary cigarettes A-04, A-05, B-04 and B-05, adding plain silica into the tobacco increases the PAHs in the particular phase. For the exemplary cigarettes A-02, A-03, B-02 and B-03, a combination of two opposite effects of glycerin and silica gel on PAHs (which might be competing) appears to be shown.

The tobacco specific nitrosamines (TSNAs) on a TPM basis and the percent change in the TSNA vs. exemplary control cigarettes are shown in Table 12 and Table 13, respectively.

TABLE 12

TSNAs per TPM

| Cigarette | Cig. Code | Cigarette Description | Puff Count | TPM (mg/cigt) | NNN/TPM (ng/mg) | NNK/TPM (ng/mg) | NAT/TPM (ng/mg) | NAB/TPM (ng/mg) |
|---|---|---|---|---|---|---|---|---|
| 11-mg tar | A-01 | Control (8 mm C-Beads in Filter) | 6.13 | 12.10 | 6.07 | 4.22 | 5.77 | 0.81 |
| | A-02 | 110 mg (Silica + glycerin) in filler | 8.03 | 14.47 | 4.66 | 3.12 | 4.36 | 0.59 |
| | A-03 | 220 mg (Silica + glycerin) in filler | 9.70 | 14.50 | 3.88 | 2.67 | 3.57 | 0.46 |
| | A-04 | 50 mg (Silica only) in filler | 7.20 | 10.77 | 6.76 | 4.52 | 5.95 | 0.84 |
| | A-05 | 100 mg (Silica only) in filler | 7.87 | 8.87 | 6.72 | 4.18 | 6.42 | 0.91 |
| 6-mg tar | B-01 | Control (8 mm C-Beads in Filter) | 6.60 | 6.63 | 5.79 | 4.22 | 4.95 | 0.75 |
| | B-02 | 110 mg (Silica + glycerin) in filler | 8.97 | 6.40 | 4.53 | 2.99 | 4.05 | 0.57 |
| | B-03 | 220 mg (Silica + glycerin) in filler | 11.23 | 5.40 | 3.72 | 2.48 | 3.31 | 0.42 |
| | B-04 | 50 mg (Silica only) in filler | 7.37 | 4.43 | 6.97 | 4.31 | 5.92 | 0.83 |
| | B-05 | 100 mg (Silica only) in filler | 8.30 | 3.40 | 7.22 | 4.25 | 6.58 | 0.85 |

TABLE 13

Percent change in TSNAs per TPM vs. control

| Cigarette | Cig. Code | Cigarette Description | Puff Count | TPM (mg/cigt) | NNN/TPM (% change) | NNK/TPM (% change) | NAT/TPM (% change) | NAB/TPM (% change) |
|---|---|---|---|---|---|---|---|---|
| 11-mg tar | A-01 | Control (8 mm C-Beads in Filter) | 6.13 | 12.10 | 0.00 | 0.00 | 0.00 | 0.00 |
| | A-02 | 110 mg (Silica + glycerin) in filler | 8.03 | 14.47 | −23.19 | −26.13 | −24.42 | −27.13 |
| | A-03 | 220 mg (Silica + glycerin) in filler | 9.70 | 14.50 | −36.02 | −36.69 | 48.25 | −43.99 |
| | A-04 | 50 mg (Silica only) in filler | 7.20 | 10.77 | 11.36 | 6.96 | 3.05 | 3.24 |
| | A-05 | 100 mg (Silica only) in filler | 7.87 | 8.87 | 10.70 | −0.92 | 11.27 | 12.41 |
| 6-mg tar | B-01 | Control (8 mm C-Beads in Filter) | 6.60 | 6.63 | 0.00 | 0.00 | 0.00 | 0.00 |
| | B-02 | 110 mg (Silica + glycerin) in filler | 8.97 | 6.40 | −21.88 | −29.18 | −18.24 | −23.48 |
| | B-03 | 220 mg (Silica + glycerin) in filler | 11.23 | 5.40 | −35.76 | −41.21 | −33.16 | −43.94 |
| | B-04 | 50 mg (Silica only) in filler | 7.37 | 4.43 | 20.30 | 2.06 | 19.55 | 11.46 |
| | B-05 | 100 mg (Silica only) in filler | 8.30 | 3.40 | 24.54 | 0.57 | 32.90 | 13.93 |

As shown in Tables 12 and 13, the TSNAs decrease for the exemplary cigarettes A-02, A-03, B-02 and B-03 compared to the exemplary control cigarettes, but increase for the exemplary cigarettes A-04, A-05, B-04 and B-05 compared to the control. Again, the TSNA values of A-02, A-03, B-02 and B-03 may result from the competing effects of silica and glycerin on the TSNA in particular phase.

The phenolic compounds on a TPM basis and their change vs. exemplary control cigarettes are listed in Table 14 and Table 15, respectively.

TABLE 14

Phenolics Per TPM

| Cigarette | Cig. Code | Cigarette Description | Puff Count | TPM (mg/cigt) | Hydro-quinone per TPM (µg/mg) | Resorcinol per TPM (µg/mg) | Catechol per TPM (µg/mg) | Phenol per TPM (µg/mg) | p-Cresol per TPM (µg/mg) | m-Cresol per TPM (µg/mg) | o-Cresol per TPM (µg/mg) |
|---|---|---|---|---|---|---|---|---|---|---|---|
| 11-mg tar | A-01 | Control (8 mm C-Beads in Filter) | 6.13 | 12.10 | 3.21 | 0.14 | 2.88 | 0.90 | 0.47 | 0.24 | 0.21 |
| | A-02 | 110 mg (Silica + glycerin) in filler | 8.03 | 14.47 | 2.32 | 0.08 | 1.97 | 0.36 | 0.18 | 0.06 | 0.09 |
| | A-03 | 220 mg (Silica + glycerin) in filler | 9.70 | 14.50 | 1.88 | 0.06 | 1.59 | 0.21 | 0.10 | 0.03 | 0.06 |
| | A-04 | 50 mg (Silica only) in filler | 7.20 | 10.77 | 3.49 | 0.12 | 2.99 | 0.71 | 0.35 | 0.20 | 0.18 |
| | A-05 | 100 mg (Silica only) in filler | 7.87 | 8.87 | 3.74 | 0.12 | 2.94 | 0.43 | 0.26 | 0.12 | 0.10 |
| 6-mg tar | B-01 | Control (8 mm C-Beads in Filter) | 6.60 | 6.63 | 3.27 | 0.12 | 3.02 | 0.69 | 0.36 | 0.18 | 0.17 |
| | B-02 | 110 mg (Silica + glycerin) in filler | 8.97 | 6.40 | 2.38 | 0.06 | 2.08 | 0.17 | 0.05 | N.D. | 0.03 |
| | B-03 | 220 mg (Silica + glycerin) in filler | 11.23 | 5.40 | 2.17 | 0.04 | 1.81 | 0.09 | N.D. | N.D. | N.D. |
| | B-04 | 50 mg (Silica only) in filler | 7.37 | 4.43 | 4.42 | 0.11 | 3.74 | 0.43 | 0.18 | 0.11 | 0.09 |
| | B-05 | 100 mg (Silica only) in filler | 8.30 | 3.40 | 4.47 | 0.12 | 3.32 | 0.12 | N.D. | N.D. | N.D. |

TABLE 15

Percent change in phenolics per TPM vs. control

| Cigarette | Cig. Code | Cigarette Description | Puff Count | TPM (mg/cigt) | Hydro-quinone per TPM (% change) | Resorcinol per TPM (% Change) | Catechol per TPM (% change) | Phenol per TPM (% change) | p-Cresol per TPM (% change) | m-Cresol per TPM (% change) | o-Cresol per TPM (% change) |
|---|---|---|---|---|---|---|---|---|---|---|---|
| 11-mg tar | A-01 | Control (8 mm C-Beads in Filter) | 6.13 | 12.10 | 0.00 | 0.00 | 0.00 | 0.00 | 0.00 | 0.00 | 0.00 |
| | A-02 | 110 mg (Silica + glycerin) in filler | 8.03 | 14.47 | −27.78 | −45.88 | −31.50 | −60.10 | −61.85 | −74.04 | −58.18 |
| | A-03 | 220 mg (Silica + glycerin) in filler | 9.70 | 14.50 | −41.29 | −60.73 | −44.61 | −76.27 | −78.04 | −85.61 | −74.32 |
| | A-04 | 50 mg (Silica only) in filler | 7.20 | 10.77 | 8.91 | −14.06 | 3.99 | −21.64 | −25.08 | −14.74 | −17.87 |
| | A-05 | 100 mg (Silica only) in filler | 7.87 | 8.87 | 16.77 | −11.70 | 2.35 | −52.42 | −44.93 | −48.24 | −52.76 |
| 6-mg tar | B-01 | Control (8 mm C-Beads in Filter) | 6.60 | 6.63 | 0.00 | 0.00 | 0.00 | 0.00 | 0.00 | 0.00 | 0.00 |
| | B-02 | 110 mg (Silica + glycerin) in filler | 8.97 | 6.40 | −27.40 | −48.18 | −31.08 | −75.22 | −87.04 | N.A.[1] | −81.16 |
| | B-03 | 220 mg (Silica + glycerin) in filler | 11.23 | 5.40 | −33.77 | −69.29 | −39.81 | −86.65 | N.A.[1] | N.A.[1] | N.A.[1] |
| | B-04 | 50 mg (Silica only) in filler | 7.37 | 4.43 | 35.14 | −6.48 | 24.19 | −38.20 | −50.13 | −37.66 | −45.59 |
| | B-05 | 100 mg (Silica only) in filler | 8.30 | 3.40 | 36.66 | −2.45 | 10.23 | −83.03 | N.A.[1] | N.A.[1] | N.A.[1] |

As shown in Tables 14 and 15, significant reduction in phenolic levels can be achieved through the addition of either plain silica or glycerin-impregnated silica into the tobacco rod.

In summary, it appears that the addition of glycerin-impregnated silica in a tobacco rod can appreciably have an effect on constituents in tobacco smoke including PAHs, TSNAs and phenolics. Thus, immobilized diluents, such as glycerin-impregnated silica, appear to be able to have beneficial properties for smoking.

While the invention has been described in detail with reference to specific embodiments thereof, it will be apparent to one skilled in the art that various changes and modification may be made, and equivalents thereof employed, without departing from the scope of the claims.

The invention claimed is:

1. A method of making a cigarette, comprising:
   forming immobilized diluents by incorporating diluents in sorbent materials;
   mixing the immobilized diluents with tobacco cut filler;
   forming a tobacco rod from the tobacco cut filler with the immobilized diluents mixed therein; and
   attaching the tobacco rod to a filter, wherein the diluent comprises an aerosol forming agent and the sorbent comprises a porous material with a surface area of at least 50 m2/g, and/or wherein the sorbent has a pore volume of about 0.2 cc/g to about 1.5 cc/q.

2. The method of claim 1, wherein the forming immobilized diluents step comprises:
   heating the sorbent materials and the diluents in a sealed container to impregnate liquid diluents in sorbent materials.

3. The method of claim 1, wherein the forming immobilized diluents step comprises:
   placing sorbent particulate in a vessel with liquid diluents therein; and incorporating the liquid diluents in the sorbent particulate via absorption and/or adsorption by the sorbent particulate.

4. The method of claim 3, wherein the immobilized diluents are formed by contacting sorbent particles with the diluent, pressurizing and/or heating the sorbent and diluent until the sorbent is loaded with the diluent in an amount ranging from about 60 wt. % to about 120 wt. %.

5. The method of claim 1, wherein the sorbent material comprises a rounded, spherically-shaped particle, wherein the particle is about 0.05 mm to about 2 mm in a transverse dimension, wherein the particle is capable of releasing the diluent at temperatures at or above 180° C., and/or wherein the immobilized diluent comprises up to 120 weight % diluent with respect to the weight of the sorbent.

6. The method of claim 1, wherein the sorbent comprises silica gels, molecular sieves, activated carbons, polymeric porous materials, or combinations thereof; and/or wherein the sorbent has a surface area of about 100 $m^2$/g to about 1000 $m^2$/g.

7. The method of claim 1, wherein the diluent comprises glycerin, propylene glycol, triacetin, triethylene glycol, triethyl citrate, or combinations thereof, and/or wherein the sorbent comprises silica gels, molecular sieves, activated carbons, polymeric porous materials, or combinations thereof.

8. A method of making a cigarette, comprising:
forming immobilized diluents by incorporating diluents in sorbent materials:
mixing the immobilized diluents with tobacco cut filler;
forming a tobacco rod from the tobacco cut filler with the immobilized diluents mixed therein; and
attaching the tobacco rod to a filter, wherein the sorbent comprises silica gel, the diluent comprises glycerin and/or propylene glycol, and the glycerin and/or propylene glycol is loaded into the silica gel at 60% to 120 wt % of the silica gel.

9. The method of claim 1, further comprising coating a surface of the sorbent such that the coating further immobilizes the diluent absorbed and/or adsorbed in the sorbent.

10. A method of making a cigarette, comprising:
forming immobilized diluents by incorporating diluents in sorbent materials;
mixing the immobilized diluents with tobacco cut filler;
forming a tobacco rod from the tobacco cut filler with the immobilized diluents mixed therein; and
attaching the tobacco rod to a filter, wherein the sorbent consists essentially of silica gel, molecular sieves, activated carbon, or combinations thereof.

11. The method of claim 1, wherein the filter contains a second sorbent, the second sorbent comprising a material different than the material of the first sorbent.

12. The method of claim 11, wherein second sorbent includes a diluent impregnated therein.

13. The method of clam 1, wherein the cigarette comprises about 1 to about 300 mg of immobilized diluents.

14. The method of claim 1, wherein the cigarette comprises about 1 to about 40 wt % diluents.

15. The method of claim 1, wherein the cigarette comprises about 10 to about 30 wt % diluents.

* * * * *